United States Patent
Takahashi et al.

(10) Patent No.: US 11,055,474 B2
(45) Date of Patent: Jul. 6, 2021

(54) DIGITAL COMPONENT BACKDROP RENDERING

(71) Applicant: Google LLC, Mountain View, CA (US)

(72) Inventors: Junya Takahashi, New York, NY (US); Matthew Maitland Hathorn, New York, NY (US); Daniel Patrick Lee, Brooklyn, NY (US); William Frazier Pierpont Grose, Pacific Palisades, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/887,461

(22) Filed: May 29, 2020

(65) Prior Publication Data
US 2020/0311340 A1    Oct. 1, 2020

Related U.S. Application Data

(63) Continuation of application No. 15/886,049, filed on Feb. 1, 2018, now Pat. No. 10,671,798.

(51) Int. Cl.
*G06F 17/00*    (2019.01)
*G06F 40/106*    (2020.01)
(Continued)

(52) U.S. Cl.
CPC .......... *G06F 40/106* (2020.01); *G06F 16/957* (2019.01); *G06F 16/958* (2019.01);
(Continued)

(58) Field of Classification Search
CPC .... G06F 40/106; G06F 40/166; G06F 16/958; G06F 16/957; G06F 21/53;
(Continued)

(56) References Cited

U.S. PATENT DOCUMENTS 6,199,082 B1    3/2001  Ferrel
7,996,777 B2    8/2011  Kniaz et al.
(Continued)

FOREIGN PATENT DOCUMENTS

WO    WO 2017/048496    3/2017

OTHER PUBLICATIONS

PCT International Preliminary Report on Patentability in International Application No. PCT/US2019/015423, dated Aug. 4, 2020, 8 pages.

(Continued)

*Primary Examiner* — Laurie A Ries
(74) *Attorney, Agent, or Firm* — Fish & Richardson P.C.

(57) ABSTRACT

Methods, systems, and apparatus, including computer programs encoded on a computer storage medium, for locating, using a content binder library, content elements of a publisher page. For each content element, the library determines presentation attributes of the content element and at least one other library detects a mode parameter that specifies a type of user device that is requesting the publisher page. The library selects a particular content element from the publisher page as a reference point for positioning a digital component at the publisher page using the presentation attributes of the particular content element. The library determines a location of the publisher page for rendering the digital component, where the location is determined based on the reference point and the mode parameter. The library provides the digital component for display at the location of the publisher page.

20 Claims, 7 Drawing Sheets

(51) Int. Cl.
   *G06F 21/53* (2013.01)
   *G06F 16/958* (2019.01)
   *H04L 29/06* (2006.01)
   *G06F 16/957* (2019.01)
   *G06F 40/166* (2020.01)
   *G06Q 30/02* (2012.01)

(52) U.S. Cl.
   CPC ............ *G06F 21/53* (2013.01); *G06F 40/166* (2020.01); *H04L 63/1466* (2013.01); *H04L 63/1483* (2013.01); *G06F 2221/033* (2013.01); *G06Q 30/0277* (2013.01)

(58) Field of Classification Search
   CPC ........... G06F 2221/033; H04L 63/1483; H04L 63/1466; G06Q 30/0277
   See application file for complete search history.

(56) References Cited

U.S. PATENT DOCUMENTS

| | | | |
|---|---|---|---|
| 8,650,107 B1 | 2/2014 | Lucash | |
| 8,745,477 B1 * | 6/2014 | O'Sullivan | G06F 40/103 715/200 |
| 8,768,740 B2 * | 7/2014 | Kniaz | G06Q 30/0273 705/7.22 |
| 9,098,471 B2 | 8/2015 | Richardson | |
| 9,269,096 B2 | 2/2016 | Patwa et al. | |
| 9,292,866 B2 * | 3/2016 | Allaire | G06Q 30/0273 |
| 9,443,257 B2 | 9/2016 | Dodda | |
| 9,460,530 B2 | 10/2016 | Dougherty | |
| 9,558,289 B1 | 1/2017 | Chung et al. | |
| 9,563,826 B2 | 2/2017 | Lau et al. | |
| 9,582,156 B2 * | 2/2017 | Battles | G06Q 30/0251 |
| 9,680,923 B1 | 6/2017 | Jain | |
| 9,734,519 B2 | 8/2017 | Boyle | |
| 9,881,318 B1 | 1/2018 | Krishnamoorthy | |
| 10,007,933 B2 | 6/2018 | Simeonov | |
| 2004/0260767 A1 * | 12/2004 | Kedem | G06Q 30/02 709/203 |
| 2005/0028074 A1 * | 2/2005 | Harrington | G06T 7/0002 715/234 |
| 2006/0256130 A1 | 11/2006 | Gonzalez | |
| 2007/0038931 A1 | 2/2007 | Allaire | |
| 2007/0299857 A1 | 12/2007 | Gwozdz et al. | |
| 2009/0031216 A1 | 1/2009 | Dressel | |
| 2009/0150239 A1 | 6/2009 | Dorman | |
| 2009/0313127 A1 | 12/2009 | Chaiken et al. | |
| 2010/0153836 A1 | 6/2010 | Krassner | |
| 2011/0161990 A1 | 6/2011 | Smith et al. | |
| 2011/0258056 A1 | 10/2011 | Ioffe | |
| 2012/0246017 A1 | 9/2012 | Kleber | |
| 2013/0339139 A1 * | 12/2013 | Meyers | G06Q 30/0241 705/14.49 |
| 2014/0095328 A1 * | 4/2014 | Forouzandeh | G06Q 30/0277 705/14.73 |
| 2014/0189498 A1 | 7/2014 | Liverant | |
| 2014/0258870 A1 | 9/2014 | Gordon | |
| 2015/0026825 A1 | 1/2015 | Dube | |
| 2015/0066665 A1 | 3/2015 | Long et al. | |
| 2015/0220492 A1 | 8/2015 | Simeonov et al. | |
| 2016/0259840 A1 | 9/2016 | Zheng | |
| 2016/0335680 A1 | 11/2016 | Dodda | |
| 2017/0017364 A1 | 1/2017 | Kekki | |
| 2017/0178178 A1 * | 6/2017 | Zhang | G06Q 30/0243 |
| 2017/0242931 A1 | 8/2017 | Lewis | |
| 2017/0316467 A1 | 11/2017 | Sieler et al. | |
| 2019/0080019 A1 * | 3/2019 | Young | G06K 9/6256 |
| 2019/0238952 A1 | 8/2019 | Boskovich | |
| 2019/0354546 A1 | 11/2019 | Gerlach | |

OTHER PUBLICATIONS

'www.iab.com' [online] "SafeFrame," Aug. 19, 2014, [retrieved on Feb. 1, 2018] Retrieved from Internet: URL< https://www.iab.com/guidelines/safeframe/> 3 pages.

PCT International Search Report Issued in International Application No. PCT/US2019/015435, dated Apr. 8, 2019, 14 pages.

* cited by examiner

DIGITAL COMPONENT BACKDROP RENDERING

CROSS REFERENCE TO RELATED APPLICATION

This application is a continuation of U.S. application Ser. No. 15/886,049, filed Feb. 1, 2018, the contents of which are incorporated by reference herein.

BACKGROUND

This specification relates to rendering digital content.

Web pages are configured to display a variety of different types of content. The content rendered at a web page can be provided by a publisher or host of the page as well as by a third party that supplies other content for rendering alongside the publisher's content. Generally, presentation of the other content provided by the third party is controlled by the publisher. In some situations, content from multiple different providers can be integrated into a single electronic document to create a composite document, such as a publisher web page that displays multiple content elements. For example, a portion of the content included in the electronic document may be selected (or specified) by a publisher of the electronic document or web page. A different portion of content (e.g., a digital component) can be provided by a third-party (e.g., an entity that is not a publisher of the web page and/or does not have access to modify code defining the content of the publisher page). Rendering the different portion of content can sometimes involve a third party system being granted access to the publisher page, so that the third party can control the publisher page to insert their portion of the content at the page. However, such access and control can present security risks that expose a publisher's system, or web page, to unauthorized network intrusion and potential exfiltration of sensitive information by malicious actors.

SUMMARY

Methods, systems, and apparatus, including computer programs encoded on a computer storage medium, for locating, using a content binder library, content elements that make up a publisher page. For each content element, the content binder library, determines presentation attributes of the content element and detects a mode parameter that specifies a type of user device that is requesting the publisher page. The content binder library selects a particular content element from the publisher page as a reference point for positioning a backdrop creative, that includes a digital component (e.g., Ad content), at the publisher page using the presentation attributes of the particular content element. The content binder library determines a location of the publisher page for rendering the backdrop creative along with the digital component. The location of the publisher page where the backdrop creative is rendered is determined based on the reference point and the mode parameter. The content binder library provides the digital component for integrated display at the location of the publisher page adjacent to content elements of the publisher page.

One aspect of the subject matter described in this specification can be embodied in a computer-implemented method. The method, includes, locating, using a content binder library, content elements of a publisher page; and for each content element of the publisher page: determining, using the content binder library, presentation attributes of the content element, the presentation attributes comprising a size attribute specifying a size of the content element and a relative position of the content element of the publisher page. The method includes, detecting a mode parameter that specifies a type of user device that is requesting the publisher page; and selecting, using the content binder library, a particular content element from the publisher page as a reference point for positioning a digital component at the publisher page using the presentation attributes of the particular content element. The method includes, determining, using the content binder library, a location of the publisher page for rendering the digital component, the location being determined based on the reference point and the mode parameter; and providing, using the content binder library, the digital component for display at the location of the publisher page.

These and other implementations can each optionally include one or more of the following features. For example, in some implementations, the content binder library is configured to: insert a secure iframe for rendering the digital component at the location of the publisher, communicate with a rendering library, receive the digital component from the rendering library, and cause the digital component to be integrated into the publisher page using the secure iframe inserted at the location of the publisher page, wherein the location is adjacent to the particular content element of the publisher page.

In some implementations, selecting the particular content element includes: identifying a second reference point for inserting a cutout at the publisher page based on the type of user device specified by the mode parameter, the second reference point representing at least one other location of the publisher page for: rendering a portion of the digital component integrated into the publisher page adjacent the particular content element, or rendering another different digital component provided for display at the publisher page.

In some implementations, identifying the second reference point at the publisher page includes: identifying one or more candidate content elements based on a respective depth value of each candidate content element, each respective depth value being computed with reference to a root node of the publisher page; filtering one or more candidate content elements that overlap with a first viewport-sized area of the publisher page; in response to filtering, selecting a content element from among a remaining set of candidate content elements, the content element being selected based on a respective depth value that indicates the content element is closest to the root node of the publisher page; and identifying the second reference point at the publisher page based on the selected content element.

In some implementations, providing the digital component for display at the location of the publisher page includes providing the digital component for rendering at the location of the publisher page based on a request from the rendering library.

In some implementations, the rendering library includes a plurality of digital components that are formatted for display at a plurality of different types of publisher pages, and the plurality of digital components includes at least one of: a backdrop creative component or a rich media creative component.

In some implementations, the mode parameter specifies the type of user device as a mobile computing device and the content elements are for display at a publisher page configured for the mobile computing device, and determining the location for the publisher page includes: determining the location based on the respective size attributes specifying the size of each content element and the respective relative positions of each content element displayed at the publisher page configured for the mobile computing device.

In some implementations, the method further includes, determining, using the content binder library, a rendering layout for integrating and displaying the digital component at the publisher page, wherein the rendering layout is determined based on metadata of the digital component received from the rendering library.

In some implementations, providing the digital component for display at the location of the publisher page includes: providing the digital component from the rendering library, wherein the rendering library represents a first domain that is precluded from accessing the publisher page; and receiving the digital component at the content binder library, wherein the content binder library represents a second domain that is separate from the first domain and that is configured for access by the first domain of the rendering library; and configured to access a third domain for digital components that are integrated at the publisher page.

In some implementations, the third domain is a sandboxed execution environment of the publisher page that is configured to preclude third party access to the publisher page; the third domain is separate from the first domain of the rendering library and the second domain of the content binder library; and digital components of the third domain that are integrated at the publisher page communicate with the rendering library via a secure communication channel established by the content binder library.

Another aspect of the subject matter described in this specification can be embodied in a computing system. The computing system includes a content binder library that locates content elements for display at a publisher page, wherein the content binder library is configured to: determine, for each content element displayed at the publisher page, presentation attributes of the content element, the presentation attributes comprising a size attribute specifying a size of the content element and a relative position of the content element of the publisher page; and receive information relating to a mode parameter that specifies a type of user device that is requesting the publisher page. The system further includes a data integrator that communicates with the publisher page and computing logic of the content binder library, wherein the data integrator is configured to: select a particular content element from the publisher page as a reference point for positioning a digital component at the publisher page using the presentation attributes of the particular content element; determine a location of the publisher page for rendering the digital component, the location being determined based on the reference point and the mode parameter; and provide the digital component for display at the location of the publisher page.

These and other implementations can each optionally include one or more of the following features. For example, in some implementations, the system further includes a rendering library configured to: communicate with the content binder library to provide the digital component to the content binder library, wherein the content binder library is configured to insert a secure iframe for rendering the digital component at the location of the publisher page and cause the data integrator to integrate the digital component into the publisher page using the secure iframe inserted at the location of the publisher page, wherein the location is adjacent to the particular content element of the publisher page.

In some implementations, the data integrator selects the particular content element by identifying a second reference point at the publisher page based on the type of user device specified by the mode parameter, the second reference point representing at least one other location of the publisher page for rendering: a portion of the digital component integrated into the publisher page adjacent the particular content element, or another different digital component provided for display at the publisher page.

In some implementations, the data integrator is configured to identify the second reference point at the publisher page by: i) identifying one or more candidate content elements based on a respective depth value of each candidate content element, each respective depth value being computed with reference to a root node of the publisher page; ii) filtering one or more candidate content elements that overlap with a first viewport-sized area of the publisher page; iii) in response to filtering, selecting a content element from among a remaining set of candidate content elements, the content element being selected based on a respective depth value that indicates the content element is closest to the root node of the publisher page; and iv) identifying the second reference point at the publisher page based on the selected content element. In some implementations, the data integrator is configured to provide the digital component for display at the location of the publisher page based on a request from the rendering library.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular embodiments of the subject matter described in this specification can be implemented so as to realize one or more of the following advantages. A rendering module of a computing system executes specific computing rules for implementing a content binder library and a rendering library that interact to integrate digital components at a web page. The digital components are associated with backdrop creatives that can be integrated at a publisher web page to wrap or surround content elements of the web page without obscuring the content. The rendering module efficiently generates different backdrop formats to integrate and effectively display digital components at the publisher page based on a type of user device that requests the page without obscuring content of the publisher page (e.g., content items that make up the publisher page). Techniques are described for inserting secure iframes at a web page, which enable digital components to be positioned adjacent to content elements of the page without providing a third party direct access to the web page.

The described computing processes enable a repeatable automated process for effectively displaying, and securely integrating, third party content that previously could not be performed by computer systems in an efficient manner. For example, the system uses a specific set of computational rules that consistently and efficiently enable third party providers to generate digital components that can be integrated at a variety of publisher pages without requiring subjective human design analysis that would otherwise be required. The specific computing rules can be used to generate backdrop formats for integrating digital components at publisher page irrespective of the different ways in which a page might organize or format their content. As such, the described techniques enable a computer to perform operations that the computer was previously unable to perform due to: i) the subjective nature of how designers selected locations for presentation of content on a page, ii) the dynamic nature of how web pages are presented (e.g., the different devices on which web pages can be presented and the ability for the web page presentation to change based on the orientation of the device because of the ability for a user to rotate device screens to reformat the presentation of the web page), and iii) the challenges with developing standardized processes for securely enabling integration of third party content at web pages without obscuring content of the page or compromising the security of the page.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
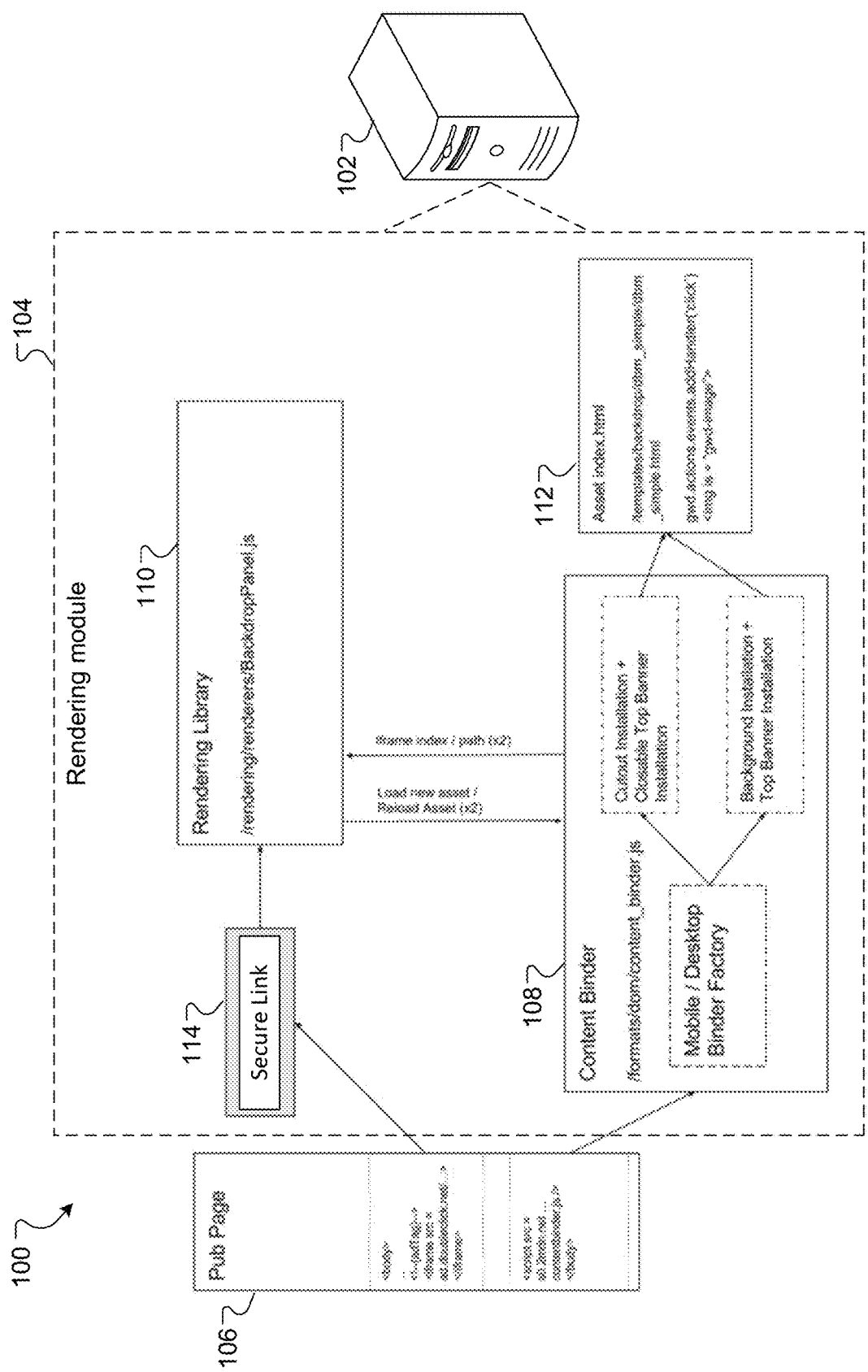
FIG. 1 is a block diagram of an example computing system for rendering a digital component at a publisher page.

This document describes methods for rendering digital components that are integrated as a backdrop creative at a web page. A "backdrop creative" or "creative asset" can refer to an iframe inserted at an electronic document, such as an HTML web page, based on an analysis of content elements that make up the electronic document (e.g., based on an analysis of content and/or content containers that are specified in the document object model (DOM) of the web page). The iframe can be configured to render a digital component in a sandboxed execution environment that is separate from the web page, thereby enabling the digital component to appear as one of the content elements of the web page itself. In general, a content element can represent a portion of content that is part of a web page, where the content of the web page can include content elements, digital components that are integrated with the content elements, or other content that may define various items of a web page. In some implementations, a backdrop creative that includes a digital component can be a web page designed by a creative designer for integration at a publisher page. The digital component can represent message content crafted by the creative designer for inclusion at the web page.

As explained in detail throughout this document, a computing system uses specific computational processes/rules that enable content providers (e.g., third party providers) to create whole-site creatives that run on a variety of publisher web pages without degrading the creative experience. For example, the system includes a content binder library that scans a publisher page to automatically locate and select a content element of the page that is used as a reference point for dynamically positioning and integrating a backdrop creative that renders one or more digital components at the publisher page. The content element that is used as the reference point is selected based on presentation attributes (e.g., size and relative location of the content) which indicate that a particular content element is an HTML element that contains a majority (or a primary portion or focal point) of the publisher's content on the page. The content binder library uses the reference point to determine a location for positioning and integrating the backdrop creative that renders the one or more digital components (e.g., content provided by a third party that differs from the publisher) at the publisher page.

To facilitate the integration of a backdrop creative into a publisher page, the content binder library receives requests for rendering digital components from a rendering library of the system. When a backdrop creative is selected for display at a publisher page, one or more rendering libraries can be placed at the publisher page using at least the content binder library. For example, the rendering library can request that the content binder library integrate a digital component into the publisher page at the determined location. Based on the received request, the content binder library uses specific computing rules (discussed in more detail below) to insert iframes for defining a backdrop creative and for positioning digital components within the backdrop creative at the location, e.g., adjacent to the reference point indicated by the selected content element. The content binder library directs the iframe to engage in secure communications with other computing servers of the system to obtain the backdrop creative that is integrated at the publisher page. The webpage corresponding to the backdrop creative is received and loaded into the iframe and rendered at the publisher page. The backdrop creative is rendered at the publisher page using a sandboxed execution context (e.g., a secure iframe) to prevent the third party from gaining control or access to the publisher's page, thereby preventing a malicious actor from gaining control of the publisher's page. In some implementations, digital components are positioned within the backdrop creative so as to give an appearance that a publisher's page has been wrapped in a content skin generated by a creative designer so that there is a unified look and feel to the publisher's page, rather than the digital component simply appearing to have been inserted into a slot of the page.

As used throughout this document, the phrase "digital component" refers to a webpage, a discrete unit of digital content or digital information (e.g., a video clip, audio clip, multimedia clip, rich media, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. The phrase "digital component" can refer to a portion of digital content that is embedded into an electronic document that is provided by an entity different from the provider of the digital component.

FIG. 1 shows a block diagram of a computing system 100 for rendering a digital component at a publisher page. System 100 includes a computing server 102 that uses software instructions for accessing, implementing, or executing a rendering module 104. As indicated at FIG. 1, rendering module 104 can use specific computing rules to render digital components at a publisher page 106. For example, rendering module 104 can interact with publisher page 106 to analyze presentation attributes for content elements that make up the publisher page. Rendering module 104 uses the presentation attributes to determine at least one location of publisher page 106 for integrating and displaying a digital component as a backdrop (e.g., in a backdrop creative) at publisher page.

Computing server 102 is configured to use rendering module 104 to access and provide digital components that are formatted for display as a backdrop (e.g., in a backdrop creative) at publisher page 106. In some implementations, rendering module 104 is included within server 102 as a sub-system of hardware circuits that includes one or more processor microchips. In general, server 102 can include processors, memory, and data storage devices that collectively form computer systems of server 102. Processors of the computer systems process instructions for execution by server 102, including instructions stored in the memory or on the data storage device to display graphical information for output at a user device.

Execution of the stored instructions can cause one or more of the actions described herein to be performed by server 102 or rendering module 104. In some implementations, multiple processors may be used, as appropriate, along with multiple memories and types of memory. For example, server 102 may be connected with multiple other computing devices, with each device (e.g., a server bank, groups of servers, modules, or a multi-processor system) performing portions of the actions, operations, or logical flows described in this specification.

Rendering module 104 includes a content binder library 108 ("binder library 108"), a rendering library 110, and an asset index 112. Binder library 108 is configured to locate content elements that make up a publisher page 106 and to determine one or more locations for positioning backdrop creatives and/or digital components for display at publisher page 106. For example, binder library 108 is configured to locate headers and page elements of publisher page 106 on which to install digital components, using backdrop creatives, that contain third party content, which can include any content including advertising content. Binder library 108 can inject, bind, or otherwise integrate backdrop creatives at publisher page 106 as well as execute changes to the page that may be needed to correctly integrate the backdrop creatives and display the digital components using the backdrop creatives. For example, some changes that are executed can include adjusting or changing a background color of publisher page 106, inserting one or more "spacer" elements that function to shift or move content of publisher page 106 (e.g., shift the content upwardly or downwardly), adjust the width of publisher page 106, adjust a CSS position property of various content elements of publisher page 106, or adjusting a scroll position of publisher page 106. Some adjustments (e.g., changes to scroll position and page width) can be performed immediately before executing computing processes for integrating a backdrop create at publisher page 106 and then are changed back immediately afterwards. In some implementations, others changes, such as adjustments to the background color, remain for a duration of time in which a user visits the web page.

As described in more detail below, binder library 108 scans publisher page 106 to determine which content elements of a page are header elements (e.g., using positioning and extent rules for designating the content elements as header elements). Binder library 108 determines whether a content element of publisher page 106 is a header element based on one or more criteria. For example, an element of publisher page 106 can be considered a header element if the element meets the following criteria: i) the element is determined to be at the top of the page or is immediately below another element that is already identified as a header element; ii) the element does not extend beyond a first viewport of publisher page 106; iii) the element extends the full width of publisher page 106; and iv) the element meets a minimum aspect ratio threshold (e.g., the element is a sufficiently short and wide element relative to an example view port of publisher page 106). In some implementations, binder library 108 scans publisher page 106 for visible elements, such as elements that could possibly be seen by a human eye on the page. Binder library 108 determines whether an element is visible or not based on whether the element's CSS properties indicate that the element should be visible and also whether the element is "masked" out of the page by an ancestor element. For example, an element can be masked out when placed outside the bounds of a parent element and the parent element has CSS properties that are set to show nothing that extends past the bounds of the parent element. Hence, an element that is merely behind another element would be considered, but an element that is "masked" by its parent element would not be considered.

Rendering library 110 communicates with the binder library 108 to provide digital components for integration at a given location of the publisher page 106 as determined by binder library 108. In some implementations, the given location is at least near (e.g., substantially near, such as within a specified number of pixels of) or immediately adjacent to a particular content element (e.g., a header element) of publisher page 106. For example, binder library 108 determines the given location based on presentation attributes of each content element of publisher page 106 and communicates with rendering library 110 to position and integrate a digital component(s) at publisher page 106 based on the determined location. In some implementations, the digital component is integrated at publisher page 106 in response to one or more requests from rendering library 110 that are received for processing at binder library 108. Although indicated as being under the control of rendering module 104, binder library 108 and rendering library 110 may exist as independent computing libraries of server 102 and which are outside of the direct control of a computing entity such as rendering module 104.

Binder library 108 can generate an asset index 112 that includes a reference (e.g., a resource locator) to an iframe for communicating with digital components that are integrated into backdrop creatives for display at publisher page 106. In some implementations, digital components can be rendered, integrated, and/or otherwise displayed at publisher page 106 in a sandboxed execution context (e.g., using a secure iframe of the backdrop creative) to prevent a third party or a malicious actor from gaining access to, or control of, publisher page 106. For example, binder library 108 can insert, at publisher page 106, an iframe into publisher page 106 for positioning and integrating a digital component at the publisher page 106. For example, binder library 108 can insert an iframe at publisher page 106 using a tag (e.g., <iframe> tag) that defines a division or a section in an HTML document such as a web page. In response to inserting the iframe, binder library 108 can generate and return a pointer (e.g., a reference pointer) to the iframe. A digital component can be included at the iframe, to form a backdrop creative, when binder library 108 returns the reference pointer.

Rendering library 110 can use the pointer data to communicate with the loaded iframe, or the digital component that is rendered by the iframe, without requiring direct control or access to publisher page 106. In some implementations, binder library 108 executes at least one scripting file to send reference data to rendering library 110 for communicating with digital components inserted at publisher page 106. For example, rendering module 104 can generate an example secure messaging link/channel 114 and use post messaging functions of the secure link 114 to securely exchange data communications at least between digital components integrated at publisher page 106 by way of the iframe of the backdrop creative and rendering library 110. In some implementations, binder library 108 serializes reference data for accessing, and communicating with, an iframe or digital component of publisher page 106 using asset index 112 and returns data about asset index 112 to rendering library 110 in order to facilitate communication between rendering library 110 and digital components of iframes included in index 112.

Rendering module 104 can detect the type of user device that is requesting, or that has requested, publisher page 106. For example, rendering module 104 detects whether the user device is a mobile device or a non-mobile device based on parameter data received from publisher page 106 or from a device that hosts, renders, or communicates with, publisher page 106. In some implementations, user devices that are mobile devices include smartphones, or other similar handheld electronic devices (e.g., iPods, mini-tablet devices, etc.). In general, these mobile devices are configured to render content elements of a publisher page based on page layouts and content formats that are configured for hardware displays included in these mobile devices. User devices that are non-mobile devices include a desktop or laptop computer, or other similar larger computing devices (e.g., full-sized tablet devices, e-readers, Chromebook, etc.). In general, these non-mobile devices are configured to render content of a publisher page based on page layouts and content formats that are configured for hardware displays included in these non-mobile devices. Generally, the hardware displays that are included in mobile devices are going to be smaller than the hardware displays of the non-mobile devices. Additionally, different mobile devices can have different size and/or aspect ratio displays. Furthermore, some devices have the ability to broadcast multimedia content to a separate display that is co-located with the devices (e.g., in a same room), such as a large screen high definition television screen, and this information can similarly be provided to the rendering module 104 for purposes of determining display attributes of the display that will ultimately present the publisher page 106.

Figure 2:
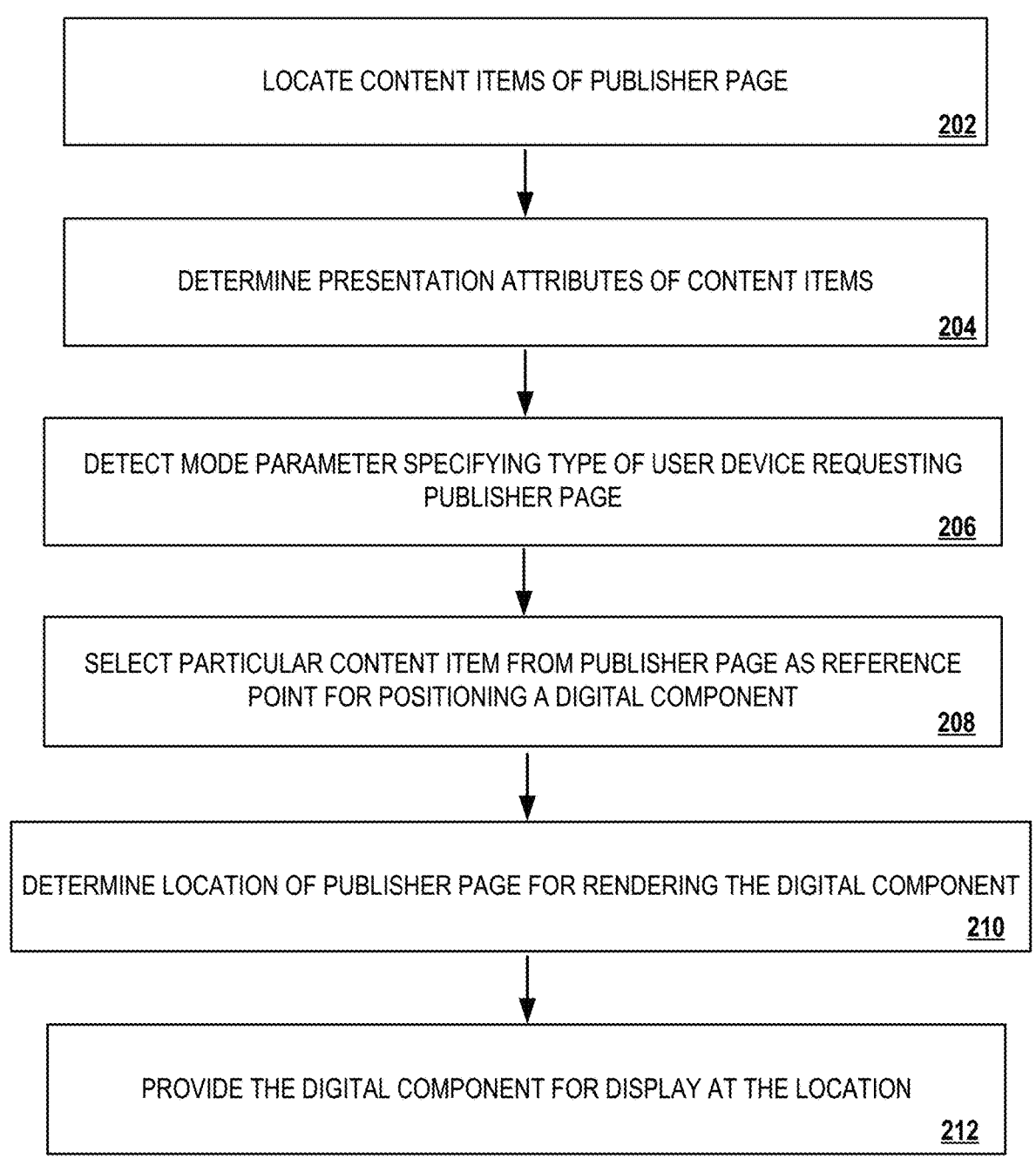
FIG. 2 is a flowchart of an example process for rendering a digital component as a backdrop at a publisher page.

FIG. 2 is a flowchart of an example process 200 for rendering a digital component as a backdrop (e.g., in an iframe of a backdrop creative) at a publisher page. Specifically, process 200 is an example process flow for determining a location of a publisher page for rendering a digital component and providing the digital component for integrating and displaying the component at the location of the publisher page. Process 200 can be implemented or executed using the system 100 described above. Hence, descriptions of process 200 may reference the above-mentioned computing resources of system 100. In general, computing steps and process flows included in the descriptions of process 200 can be grouped or arranged to occur in different orders and are not limited to the numerical sequence described herein.

Referring now to process 200, at block 202, system 100 uses binder library 108 to locate content displayed at a publisher page 106, while at block 204, for each located content of publisher page 106, binder library 108 determines presentation attributes of the content. For example, rendering module 104 uses binder library 108 to analyze information included at the publisher page 106 in order to locate multiple content elements displayed at the publisher page. To locate and determine which content of publisher page 106 is a content element, binder library 108 can perform a multi-step computing scheme (described below). In some implementations, when executing the computing scheme, all visible content of publisher page 106 can be candidates for the single content element and binder library 108 can generate a list of candidate content elements that include all visible content of the publisher page 106.

At each process step of the scheme, the candidate content elements of the list are filtered, or whittled down, until a single content element remains. In some implementations, when the single content element is found or located, the computing scheme terminates the location process irrespective of whether other process steps of the scheme have not been completed. Hence, upon locating the single content element, the computing scheme will terminate the multi-step process and return the single content element including data about the single content element. In some implementations, multiple candidate content elements may remain after all process steps of the computing scheme have been completed. In this instance, binder library 108 is configured to select the first content element in the listing of candidate content elements as the single content element.

The multi-step process of the computing scheme will now be described. First, binder library 108 identifies the location of header elements of publisher page 106 and generates a list of all possible candidate content elements. The binder library 108 generates the list in different ways based on whether a content element is being located for inserting a cutout or a banner (each described below). For a cutout, the generated list will include all candidate content elements that are "visible," based on a CSS property, as described above. For a banner (e.g., a desktop banner or a mobile banner), the generated list will include all candidate content elements that are not fixed to a viewport of the publisher page (e.g., elements with CSS position property that is not "fixed"), are not header elements, and are not masked by an ancestor or parent element, as described above. Binder library 108 discards content elements that do not overlap with at least a threshold portion of publisher page 106. As described in more detail with reference to FIG. 4A, the threshold portion of publisher page 106 can be defined by an example viewport of publisher page 106 and can correspond to a first 30% of publisher page 106. The threshold portion of publisher page 106 can correspond to an area that is bounded at the top of the page by a bottommost header of the page and at the bottom of the page by the bottom of the viewport. In some implementations, binder library 108 uses the located content element to position and display a digital component at publisher page 106. Hence, it may be desirable for a digital component, e.g., that represents an advertisement, to be visible to a user at the top of publisher page 106, or at least at a top threshold portion of the page. Hence the computing scheme can be used to ensure binder library 108 locates and/or selects a single content element that is at least near the top of publisher page 106 (e.g., within a specified number of pixels of the top or at a relative location that is closer to the top of the page than the bottom of the page).

Next, binder library 108 can set up an overlapping series of regions (e.g., vertical regions) that stretch from the top of publisher page 106 to the bottom, and retains only those content elements that intersect with the largest number of these regions. In some implementations, a single non-overlapping set of regions is sufficient to determine which content elements cover a large amount of vertical space of publisher page 106. Binder library 108 uses an overlapping set of regions to ensure that content elements that just barely intersect with a particular region are not weighted as heavily as content elements that cover more of the particular region. In some implementations, binder library 108 uses an overlapping set of horizontal windows or regions instead of vertical regions. Use of horizontal regions helps to ensure that certain content elements of publisher page 106, such as long, skinny menu bars, are not selected over other, more substantial, content element counterparts of publisher page 106.

In at least one step of the computing scheme, binder library 108 can compare content element depths of each candidate content element (or each remaining candidate element) in the listing of content elements of publisher page 106. For example, publisher page 106 can include a Document Object Model (DOM) tree that defines a structure of content elements of publisher page 106. Each content element can have a respective depth value relative to a root of the DOM tree. For example, a DOM tree of content elements of publisher page 106 can include a structure in which <html> is at the root, then <head> and <body> are its children.

Binder library 108 can identify one or more candidate content elements of publisher page 106 based on a respective depth value of each candidate content element. For example, binder library 108 communicates with publisher page 106 using coded scripts installed at publisher page 106. Using the coded scripts, binder library 108 can obtain information for determining presentation attributes of the content elements included at publisher page 106. Presentation attributes determined by binder library 108 can include depth values of items at publisher page 106 and size attributes specifying a size of a content element. In some instances, a content element's depth value indicates a relative position of the content element at publisher page 106 relative to a root of the page. For example, each respective depth value can be computed with reference to a root node of the DOM tree of publisher page 106.

To locate and select a content element as a reference point for inserting a backdrop creative, binder library 108 is configured to filter one or more candidate content elements that overlap with a first viewport-sized area of publisher page 106. In response to filtering, binder library 108 selects a content element from among a remaining set of candidate content elements, where the content element is selected based, in part, on the respective depth value that indicates the content elements position relative to the root of the DOM tree. For example, binder library 108 can identify or select a content element that is closest to the root node of the publisher page as a position or reference point for inserting an iframe for rendering a top banner or for identifying a seam element (described below).

Alternatively, binder library 108 can keep or retain content elements that are furthest from the root as determined by each element's respective depth value. For example, based on the comparison of each content element's respective depth value, binder library 108 can keep certain content elements that are furthest from the root to help ensure that the content element closest to the majority content is chosen, as opposed to wide content elements of publisher page 106 that merely wrap the actual majority content element and function to add space to the page. As discussed below, binder library 108 can integrate backdrop creatives that include digital components by positioning the backdrop creative around the single content element, or within the content element. Hence, as described herein, content elements of a web page can be defined as the content element containing the majority of the content that users visit a publisher's web page to consume, such as News Stories, "How-To" tutorial content, or Opinion Pieces.

At block 206, binder library 108 detects a mode parameter that specifies a type of user device that is requesting publisher page 106. As described above, rendering module 104 can detect the type of user device that is requesting, or that has requested, publisher page 106. For example, binder library 108 can receive parameter data that includes or defines the mode parameter specifying the type of user device. In some implementations, the mode parameter is obtained using binder library 108 and based on the executed code scripts (e.g., JavaScript files) installed at publisher page 106. The mode parameter enables binder library 108 to detect whether the type of user device requesting publisher page 106 is a mobile device or a non-mobile device and/or whether the user device is broadcasting content (e.g., wirelessly) to another device. In some implementations, the mode parameter informs the kind of requests for backdrop creatives that rendering libraries placed at publisher page 106 will make to binder library 108. Hence, binder library 108 understands, e.g., based on a mode parameter included in the request from the rendering libraries, whether to use mobile based content element detection capabilities or desktop based content element detection capabilities. Binder library 108 determines which content element detection capability to use based on the mode parameter and executes a content element detection algorithm as described herein to determine a reference point for integrating a backdrop creative.

At block 208 of process 200, binder library 108 selects the single content element (i.e., a particular content element) from publisher page 106 as a reference point for positioning a digital component at the page using the presentation attributes of the single content element. In some implementations, rendering module 104 includes a data integrator (e.g., one or more coded scripts) configured to communicate with publisher page 106 and computing logic of binder library 108 to enable selection of the single content element of publisher page 106. At block 210, binder library 108, and/or the data integrator, determines a location of the publisher page for rendering the digital component, where the location is determined based on at least the reference point and the mode parameter. For example, the location can be defined or determined using a reference point that is at least near (e.g., substantially near) or adjacent to a particular content element (e.g., a header element) of publisher page 106.

Once binder library 108 selects the content element and determines the location, binder library 108 can draw or integrate new backdrop creatives (e.g., using iframes and including digital components) into publisher page 106 in response to a request received from rendering library 110. As described in more detail below, a manner in which binder library 108 integrates new backdrop creatives at publisher page 106 differs depending on the type of user device requesting publisher page 106. For example, rendering module 104 can include a computing architecture (or multiple architectures) that uses different sets of computing rules to render digital components at publisher page 106 depending on the type of user device that is requesting and/or will render the publisher page 106. Alternatively, rendering module 104 can include and use different computing architectures for rendering digital components at a publisher page, where one architecture represents a mobile rendering mode, for rendering digital components at a publisher page 106 requested by a mobile user device, and another architecture represents a non-mobile (e.g., desktop) rendering mode, for rendering digital components at a publisher page 106 requested by a non-mobile user device.

However, for both the mobile and desktop rendering modes, rendering library 110 can request that an iframe for a top banner be drawn at publisher page 106. For example, the top banner will be integrated into the flow of publisher page 106 so as to provide fluid representations of a digital component, e.g., the top banner is not absolutely positioned, as a user navigates a publisher page. In some implementations, the top banner will have a width attribute that is set to 100% of the width of publisher page 106 (e.g., for mobile rendering mode) and a height attribute that is set in proportion to the width, irrespective of the type of user device requesting publisher page 106. The top banner can include a div having a sandboxed iframe with a source path, or secure link (e.g., a URL established by a content server of system 100), that is set to a particular backdrop asset. The particular backdrop asset can be a digital component that is specifically configured for backdrop (or cutout) rendering based on a mode parameter indicating the type of user device is a non-mobile (or a mobile) user device. In some implementations, the iframe for the top banner interacts with a <div> tag to enable adding child assets to the top banner, where the child assets are added to the div as siblings of the iframe.

At block 212 of process 200, binder library 108, and/or the data integrator of rendering module 104, provides the digital component for display at the location of publisher page 106 using a secure iframe inserted at the location. For example, binder library 108 provides the digital component for rendering at the determined location of publisher page 106 based on a request from rendering library 110 received at binder library 108. Hence, binder library 108: i) communicates with rendering library 110 (which provides the digital component); ii) receives the digital component from rendering library 110; and iii) causes the digital component to be integrated into publisher page 106 at the location using a secure iframe inserted at the location by binder library 108. Rendering library 110 can include a variety of different digital components that are each formatted for display at a variety of different types of publisher pages using one or more iframes inserted at the publisher pages via binder library 108. The digital components can include at least one of: a backdrop creative component or a rich media creative component. In some implementations, the location for integrating the digital components is adjacent to a selected content element of the publisher page, such as a content element containing the majority of the content that users visit a publisher's page to consume, such as News Stories, "How-To" tutorial content, or Opinion Pieces.

In some implementations, rendering library 110 represents a first domain (e.g., a creative domain) that is precluded from accessing the publisher page (e.g., a host page domain) and binder library 108 represents a second domain that is separate from the first domain. The second domain is: i) configured for access by the first domain of rendering library 110, ii) configured to access a third domain for digital components (e.g., an asset domain) that are integrated at the publisher page, and iii) configured for overlapping communication between each of the host page domain, the first domain, and the third domain. As used in this document, the described domains can each represent a different computing environment in which programmed instructions are executed to perform actions that align with the specific security context of that domain.

The third domain can be a sandboxed execution environment (e.g., an iframe) of publisher page 106 that is configured to preclude third party access to publisher page 106 and the host page domain. This third domain is separate from the first domain of the rendering library and the second domain of the content binder library. Digital components of the third domain that are integrated at publisher page 106 communicate with rendering library 110 via a secure communication channel (e.g., secure link 114) established by binder library 108. In some implementations, the secure communication channel is used to communicate between different domains (e.g., the first domain and the third domain) on the same machine or sets of machines within a given system.

Figure 3:
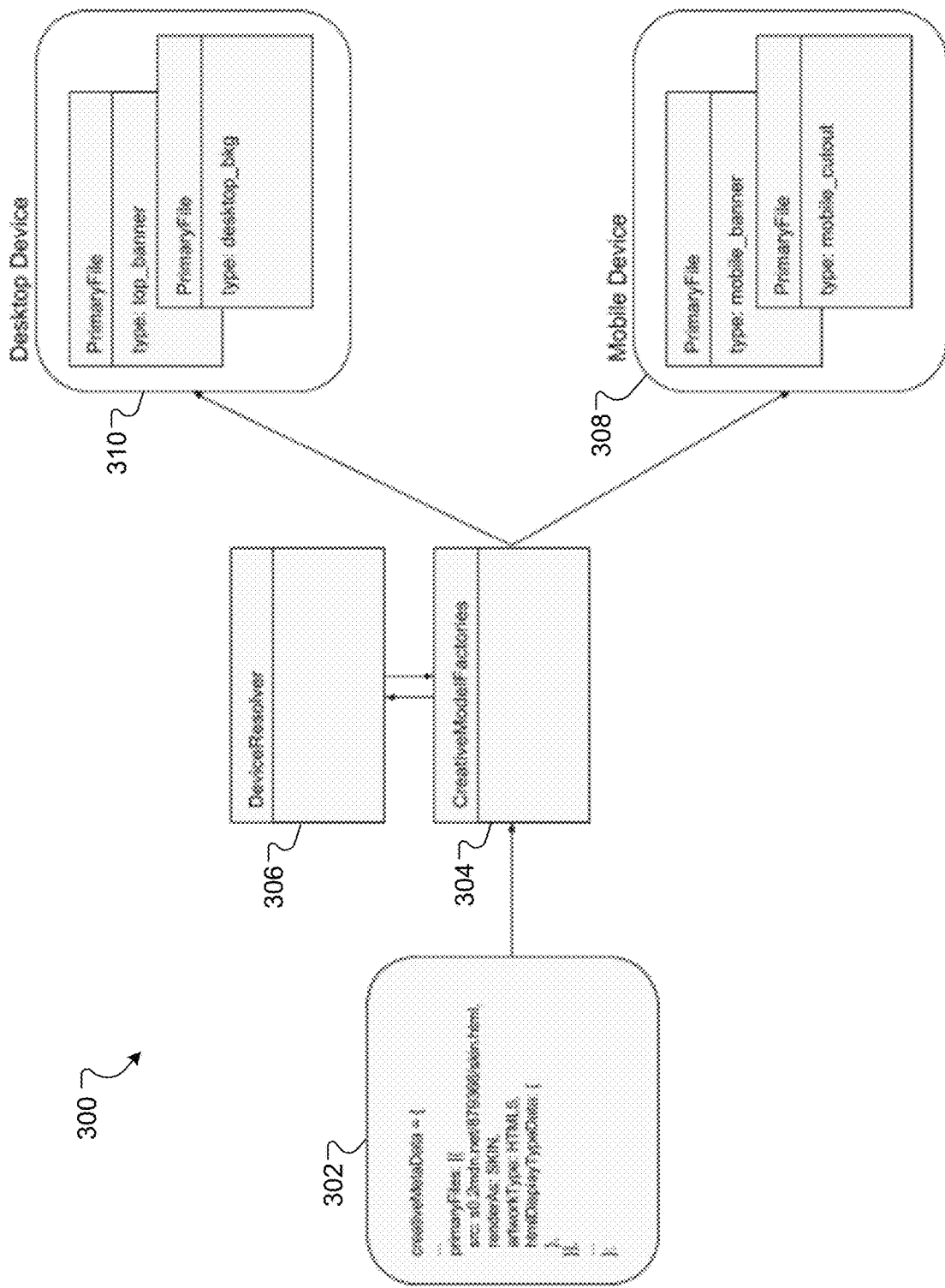
FIG. 3 is a block diagram of an example computing architecture for rendering a digital component as a backdrop at a publisher page.

FIG. 3 shows a block diagram of an example computing architecture 300, of rendering module 104 and server 102, for rendering a digital component as a backdrop at publisher page 106. As noted above, binder library 108 integrates new backdrop creatives at publisher page 106 differently based on the type of user device that is requesting, or that has requested, publisher page 106. For example, rendering module 104 can include a computing architecture 300 that executes different sets of computing rules for rendering digital components at publisher page 106. In some implementations, one set of computing rules correspond to a mobile rendering mode and another set of computing rules correspond to a non-mobile (e.g., desktop) rendering mode.

Architecture 300 indicates how PrimaryFile objects can be constructed for backdrop creatives that integrate digital components at publisher page 106. A metadata 302 provides string data to model factories 304 which examines or queries the UserAgent string (e.g., through a subordinate object) and produces either mobile PrimaryFile objects 308 or desktop PrimaryFile objects 310, based on a value of the UserAgent string. For example, creative serving at publisher page 106 can include an indication that a creative is a backdrop creative in the metadata of the primary files. In some implementations, metadata 302 for backdrop creatives and associated digital components are managed and provided by rendering library 110.

Backdrop creatives can include a single primary asset that has a renderAs value that is set to "Backdrop." Model factories 304 produces model objects from creative metadata 302 by identifying or obtaining a renderAs value and using the value as a signal indicator to produce different types of PrimaryFile model objects 308 and 310. Each PrimaryFile model object 308, 310 can have a different uniform resource locator (URL) fragment that indicates whether the PrimaryFile object should manifest as a non-mobile (desktop) device asset or a mobile device asset. For example, model factories 304 can query a UserAgent string to identify or obtain a renderAs value for determining whether a creative should be produced for mobile rendering or non-mobile rendering.

Based on the renderAs value, if the UserAgent string indicates the creative is to be rendered in a mobile environment (e.g., at a display of a smartphone), then model factories 104 can generate a mobile PrimaryFile object 308 for a backdrop creative that includes a top banner and a cutout (described below). Likewise, if the UserAgent string indicates the creative is to be rendered in a non-mobile environment (e.g., at a display of a desktop computer), then model factories 104 can generate a desktop PrimaryFile object 310 for a backdrop creative that includes a top banner and a desktop background.

The described computing rules of architecture 300 can be implemented using rendering module 104. For example, rendering module 104 can use binder library 108 to determine a rendering layout for integrating and displaying digital components at publisher page 106. In some implementations, the rendering layout is determined based on metadata of the digital component as defined by backdrop creatives received from rendering library 110. For example, binder library 108 determines the rendering layout for integrating and displaying digital components at publisher page 106 by examining or querying a UserAgent string of a creative or based on information provided to binder library 108 from one or more rendering libraries placed at a publisher page.

A backdrop renderer, associated with the data integrator, is configured to initiate a connection with binder library 108 on publisher page 106 using cross-domain messaging protocols, such as protocols of a service worker or window containing a DOM document. The renderer uses the connection to pass a URL of a PrimaryFile object 308, 310 to binder library 108, along with additional metadata about the file objects, such as where the object is, or should be, positioned in relation to a selected content element and the presentation attributes of the selected content element. In some implementations, the backdrop renderer causes requested creative assets, including digital components, to be drawn or integrated around the content element. The renderer can use a return function to pass back a means of obtaining a reference context for establishing a secure connection or link 114 to the integrated asset rendered at publisher page 106.

Figure 4A:
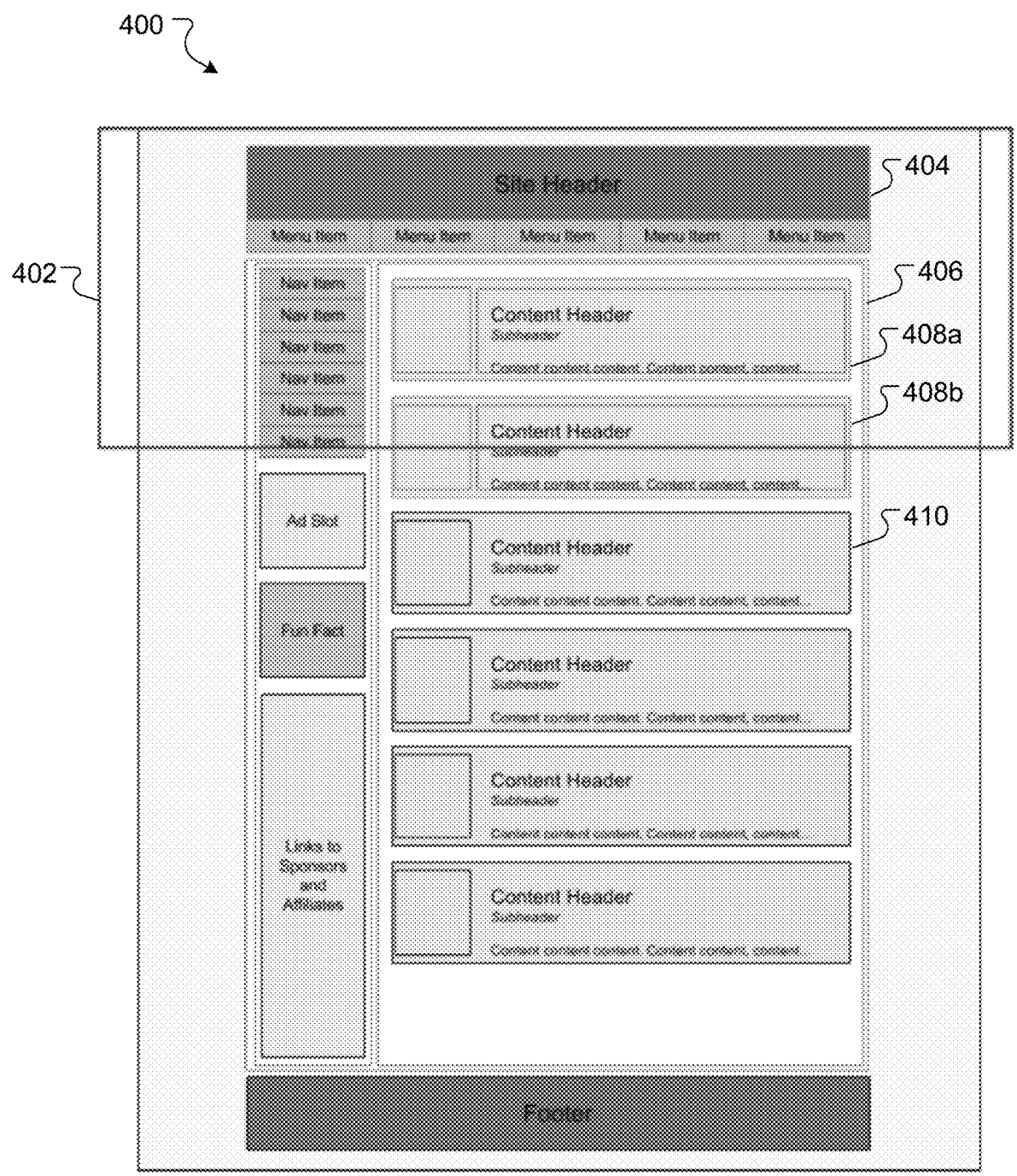
FIG. 4A shows a publisher page that includes multiple content elements.

FIG. 4A shows example content of a publisher page 400 that includes multiple items/content elements, identified as "content header." The representations of FIG. 4A can be referenced to provide additional context for locating content of a publisher page in order to select a particular content element of publisher page 106 for positioning a digital component. As discussed above, elements in a top portion of publisher page 400 are retained as candidates to ensure that the backdrop creative can be immediately visible to a user when publisher page 400 loads at a user device. View port 402 includes a portion of content elements 406 and defines a region of publisher page 400 where content headers 408a, 408b of elements 406 must overlap to be retained as candidate content elements. Hence, site header element 404 and content headers 408a, 408b overlap with the top of publisher page 400 as defined by view port 402 and are retained as candidates, while content header 410 represent other elements that are discarded or filtered from consideration as candidate content elements.

Figure 4B:
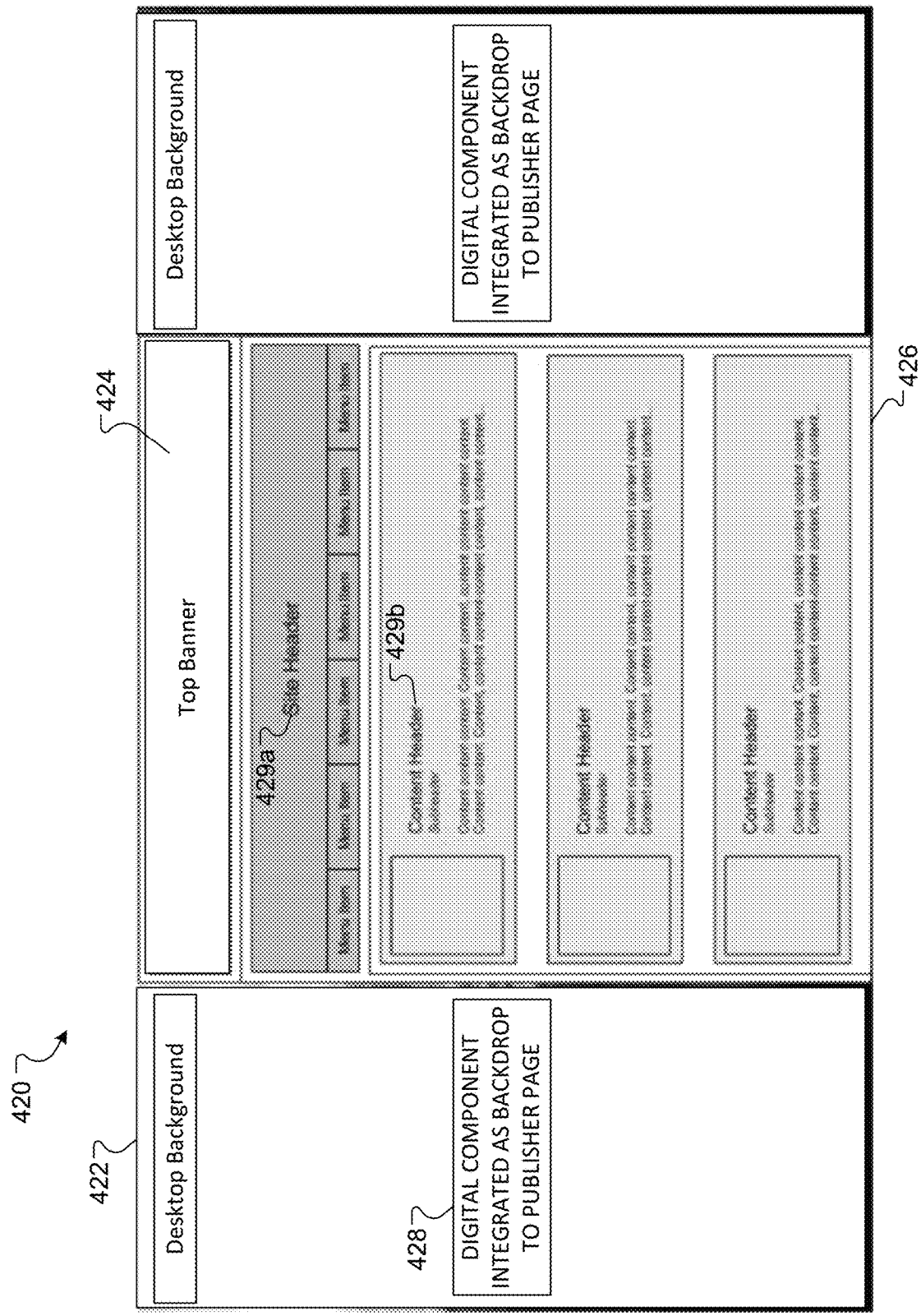
FIGS. 4B and 4C show examples of a digital component rendered at publisher page.
Figure 4C:
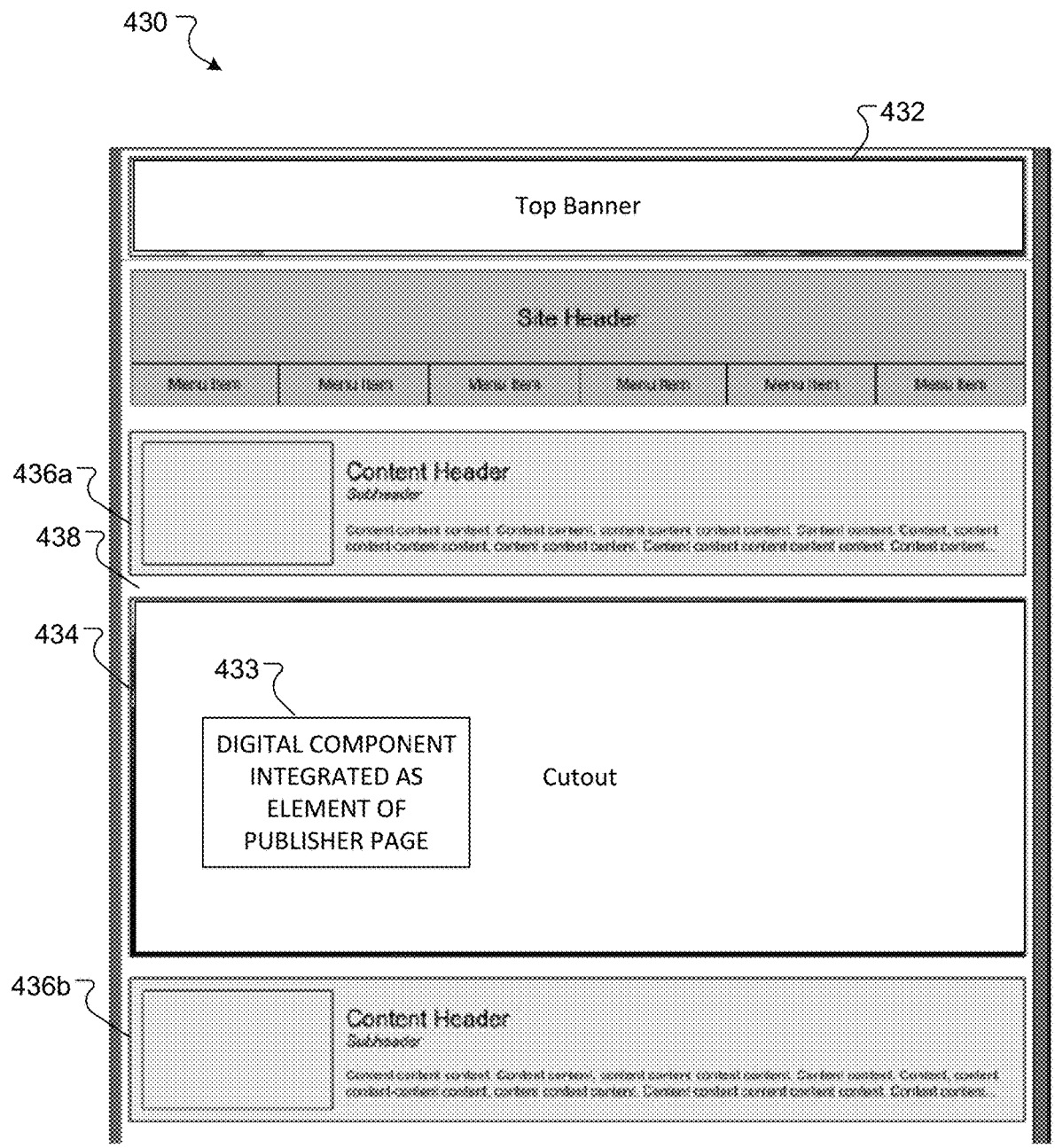

FIGS. 4B and 4C show examples of a digital component rendered at a publisher page as part of a backdrop creative. In particular, the implementation of FIG. 4B shows an example of a digital component 428 included in a backdrop creative rendered at a website or publisher page 420 configured for display at a non-mobile user device (e.g., a desktop/laptop computer). In some implementations, rendering library 110 is configured to only request a background element 422 be integrated at page 420 when metadata 302 indicates a backdrop creative is for display in a desktop environment and/or a mode parameter specifies that a non-mobile user device is requesting page 420.

Background element 422 can be positioned to be fixed and horizontally centered relative to an example viewport 426 of page 420, so that the top of the background element 422 is flush with the bottom of the bottom-most header on the publisher page. As discussed above, system 100 is capable of drawing backdrop creatives involving digital components in at least two modes, e.g., mobile mode (for smartphone type devices) or a non-mobile mode (for desktop/laptop type devices). In the desktop/non-mobile mode, binder library 108 detects that there are wide gutters between vertical edges of content elements 429a/b and the vertical edges of viewport 426 of publisher page 410. Hence, in this mode, binder library 108 is configured to render two types of backdrop creatives for integrating a digital component, namely, a top banner 424 and a desktop background element 422.

Background element 422 can include a <div> tag that wraps a secure sandboxed iframe and a secure link to rendering library 110 for loading and reloading digital components 428 that are rendered at page 420 using the iframe. The <div> tag can be inserted before a first child of a body structure of the DOM tree, so that the content elements are drawn on top of the background and the background does not obscure the content elements. In some implementations, a close button (not shown) can be inserted at a top-right corner of background element 422, e.g., as an overlay feature of background element 422. The close button is positioned as a child of the div for background element 422. A binding that controls the close button is configured to detect user clicks and notifies binder library 108 to remove a background creative from page 420 when the button is clicked.

In the implementation of FIG. 4C, an example of a backdrop creative is shown rendered at a publisher page 430 configured for a mobile device. In the context of mobile rendering, binder library 108 is used by rendering module 104 to render at least two assets: i) a top banner 432, and ii) a cutout 434. In some implementations, rendering library 110 is configured to only request that the cutout 434 be inserted at page 430 when metadata 302 indicates a backdrop creative is for display in a mobile environment and/or a mode parameter specifies that a mobile user device is requesting publisher page 430. In the visual of FIG. 4C, top banner 432 and cutout 434 are shown on one screen. However, top banner 434 and cutout 434 may not be visible at the same time if cutout 434 is rendered below a threshold portion of a publisher page (e.g., below the fold or below the bottom of the viewport as the cutout is positioned when the page loads) that is viewable at a mobile user device.

When system 100 inserts backdrop creatives involving digital components in the mobile mode (for smartphone type devices), binder library 108 uses rendering details and computing rules that differ from the desktop mode. For example, because the content elements of a publisher page generally take up far more of the available display screen at a mobile device, rather than rendering background content or visuals of a backdrop creative in the background of the publisher page, system 100 instead renders the background content/visuals in a cutout 434 inserted at the page using binder library 108. As used in this document, a cutout is an element inserted into the flow of a publisher page 430 to push pieces of content 436a (and 436b) apart, thereby giving the user a view of the background as they scroll down the publisher's page 430. Hence, in this mobile mode (for smartphone type devices), binder library 108 specific computing rules to render two types of assets, namely, top banner 432 and mobile cutout 434, that are uniquely configured to integrate a digital components 433 (or various portions of digital component 433) at publisher page 430 for rendering at a mobile user device.

In some implementations, binder library 108 inserts cutout 434 just below a bottom edge of a viewport 438 in order to create the user experience of scrolling past the background while consuming the content 436a/b of publisher page 430. For the mobile mode, selecting the particular content element for positioning a digital component of a backdrop creative can include identifying a seam element of publisher page 430 based on the type of user device (e.g., a mobile user device) specified by the mode parameter. The seam element represents at least one other location of publisher page 430 for rendering a portion of the digital component integrated at the publisher page. The seam element can be used to render a portion of a digital component adjacent to the selected content element, or for rendering another different digital component adjacent to the selected content element.

In mobile mode, a seam element can directly follow a cutout's spacer <div> tag and binder library 108 can determine which content element of publisher page 430 is the seam element and can use the seam element to determine a location for inserting cutout 434 at publisher page 430. Cutout 434 can be a mobile-specific part of a rendering layout/format. In appearance, a cutout is an element rendered in the flow of publisher page 430 that reveals the background of the page to users as they scroll past other content elements of the page. In practice, this effect is accomplished by a combination of a spacer <div> tag inserted into publisher page 430 and a fixed background element that is cropped based on predefined dimensions. Like the background element of the desktop mode, cutout 434 can include a spacer div but with an absolutely-positioned iframe. The div can be rendered in the flow of a publisher page at a fixed height that can be half of an example viewport height and 100% of the viewport width.

The iframe can be rendered as a child of the spacer div and the spacer div's overflow parameters can be set to hidden so that parts of the iframe that extend past the spacer will not be visible. As the user scrolls, a binding that controls cutout 434 can alter a position of the background so that when the spacer is at the bottom of publisher page 430, the bottom of the background is shown, and when the spacer is at the top of the page, the top of the background is shown. In some implementations, computations required to perform this movement ensure that, if the background is shorter than the viewport, a portion of empty space may appear when the spacer div is at the extremes of the viewport. As with the desktop background, cutout 434 can include a close button that has a binding configured to detect user clicks and to provide an indicator to binder library 108 to destroy a background creative in response to detecting user clicks of the close button.

Figure 5:
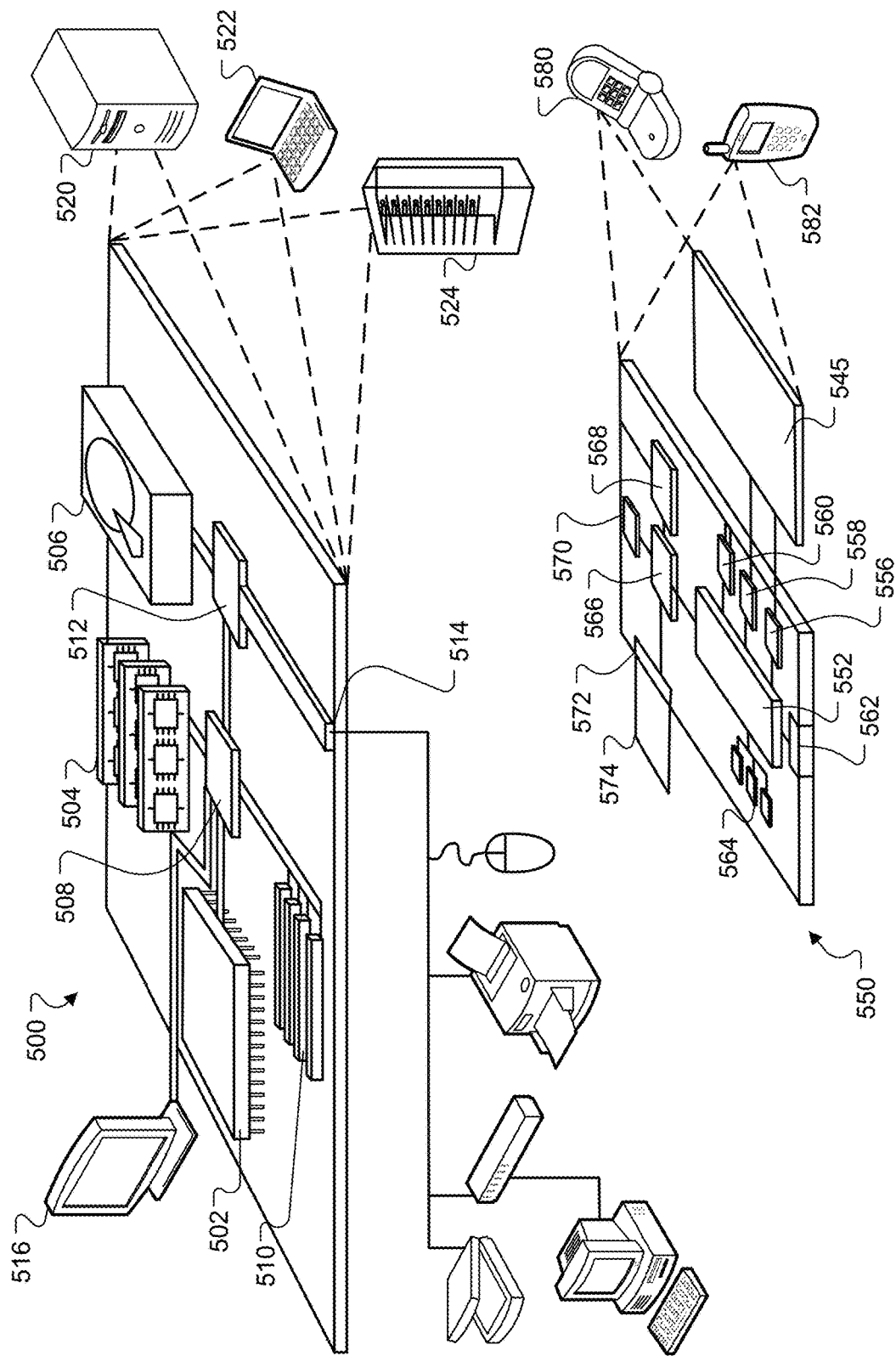
FIG. 5 is a block diagram of a computing system that can be used in connection with methods described in this specification.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

As used in this specification, the term "module" is intended to include, but is not limited to, one or more computers configured to execute one or more software programs that include program code that causes a processing unit(s)/device(s) of the computer to execute one or more functions. The term "computer" is intended to include any data processing or computing devices/systems, such as a desktop computer, a laptop computer, a mainframe computer, a personal digital assistant, a server, a handheld device, a smartphone, a tablet computer, an electronic reader, or any other electronic device able to process data.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method, comprising:
identifying a content element of a publisher page;
detecting a mode parameter that specifies a type of user device that requests the publisher page;
determining a depth value of the content element that indicates a depth of the content element relative to other content of the publisher page;
determining, based on the depth value and the mode parameter, that the content element corresponds to a reference point for integrating a digital component at the publisher page, comprising:
selecting the content element as the reference point based a position of the content element within a document object model that defines a structure of content of the publisher page, the depth value, and the mode parameter; and
providing the digital component to be integrated at a location of the publisher page that is adjacent the reference point.

2. The method of claim 1, wherein:
the publisher page comprises dynamic content that includes the content element.

3. The method of claim 2, further comprising:
integrating the digital component at the location of the publisher page without obscuring the dynamic content when presentation of the dynamic content changes based on an orientation of the particular type of user device and a configuration of a display installed at the particular type of user device.

4. The method of claim 2, further comprising, selecting the content element as the reference point based on one or more of:
a particular type of the digital component to be integrated at the publisher page; and
a rendering mode that uses metadata strings to indicate a particular environment in which the digital component will be rendered when integrated at the publisher page.

5. The method of claim 1, further comprising:
configuring a secure iframe, corresponding to a backdrop creative, to render the digital component in a sandboxed execution environment that is separate from the publisher page.

6. The method of claim 5, wherein providing the digital component to be integrated at the location of the publisher page comprises:
providing the digital component to a second domain from a first domain that is precluded from accessing the publisher page; and
providing the digital component from the second domain to the publisher page to be integrated at the location of the publisher page.

7. The method of claim 6, wherein the first domain is a rendering library and the method comprises:
generating, using the rendering library, requests to render digital components at one or more publisher pages; and communicating, by the rendering library, with digital components rendered at the one or more publisher pages using pointers to respective iframes that integrate the digital components at the one or more publisher pages.

8. The method of claim 7, wherein the second domain is a content binder library and the method comprises:
scanning the publisher page using the content binder library based on a request received from the rendering library;
automatically identifying and selecting, using the content binder library, content elements of the publisher page as reference points for integrating backdrop creatives at that publisher page; and
dynamically positioning digital components at the publisher page using the backdrop creatives.

9. The method of claim 8, further comprising:
directing, using the content binder library, the secure iframe to engage in secure communications with a computing server; and
based on the secure communications with the computing server, obtaining, using the content binder library, data corresponding to a backdrop creative to be integrated at the publisher page.

10. The method of claim 9, further comprising:
dynamically positioning and integrating the digital component at the publisher page using the backdrop creative and the secure iframe.

11. A system comprising:
one or more processing devices; and
one or more non-transitory machine-readable storage devices storing instructions that are executable by the one or more processing devices to cause performance of operations comprising:
identifying a content element of a publisher page;
detecting a mode parameter that specifies a type of user device that requests the publisher page;
determining a depth value of the content element that indicates a depth of the content element relative to other content of the publisher page;
determining, based on the depth value and the mode parameter, that the content element corresponds to a reference point for integrating a digital component at the publisher page, comprising:
selecting the content element as the reference point based a position of the content element within a document object model that defines a structure of content of the publisher page, the depth value, and the mode parameter; and
providing the digital component to be integrated at a location of the publisher page that is adjacent the reference point.

12. The system of claim 11, wherein:
the publisher page comprises dynamic content that includes the content element.

13. The system of claim 12, wherein the operations further comprise:
integrating the digital component at the location of the publisher page without obscuring the dynamic content when presentation of the dynamic content changes based on an orientation of the particular type of user device and a configuration of a display installed at the particular type of user device.

14. The system of claim 12, wherein the operations further comprise, selecting the content element as the reference point based on one or more of:

a particular type of the digital component to be integrated at the publisher page; and
a rendering mode that uses metadata strings to indicate a particular environment in which the digital component will be rendered when integrated at the publisher page.

15. The system of claim 11, wherein the operations further comprise:
configuring a secure iframe, corresponding to a backdrop creative, to render the digital component in a sandboxed execution environment that is separate from the publisher page.

16. The system of claim 15, wherein providing the digital component to be integrated at the location of the publisher page comprises:
providing the digital component to a second domain from a first domain that is precluded from accessing the publisher page; and
providing the digital component from the second domain to the publisher page to be integrated at the location of the publisher page.

17. The system of claim 16, wherein the first domain is a rendering library and the operations further comprise:
generating, using the rendering library, requests to render digital components at one or more publisher pages; and
communicating, by the rendering library, with digital components rendered at the one or more publisher pages using pointers to respective iframes that integrate the digital components at the one or more publisher pages.

18. The system of claim 17, wherein the second domain is a content binder library and the operations further comprise:
scanning the publisher page using the content binder library based on a request received from the rendering library;
automatically identifying and selecting, using the content binder library, content elements of the publisher page as reference points for integrating backdrop creatives at that publisher page; and
dynamically positioning digital components at the publisher page using the backdrop creatives.

19. The system of claim 18, wherein the operations further comprise:
directing, using the content binder library, the secure iframe to engage in secure communications with a computing server;
based on the secure communications with the computing server, obtaining, using the content binder library, data corresponding to a backdrop creative to be integrated at the publisher page; and
dynamically positioning and integrating the digital component at the publisher page using the backdrop creative and the secure iframe.

20. One or more non-transitory machine-readable storage devices storing instructions that are executable by one or more processing devices to cause performance of operations comprising:
identifying a content element of a publisher page;
detecting a mode parameter that specifies a type of user device that requests the publisher page;
determining a depth value of the content element that indicates a depth of the content element relative to other content of the publisher page;
determining, based on the depth value and the mode parameter, that the content element corresponds to a reference point for integrating a digital component at the publisher page, comprising:

selecting the content element as the reference point based a position of the content element within a document object model that defines a structure of content of the publisher page, the depth value, and the mode parameter; and providing the digital component to be integrated at a location of the publisher page that is adjacent the reference point.

\* \* \* \* \*